(12) United States Patent
Naouri

(10) Patent No.: US 11,283,734 B2
(45) Date of Patent: Mar. 22, 2022

(54) MINIMIZING ON-DIE MEMORY IN PULL MODE SWITCHES

(71) Applicant: Intel Corporation, Santa Clara, CA (US)

(72) Inventor: Ygdal Naouri, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 1512 days.

(21) Appl. No.: 14/266,250

(22) Filed: Apr. 30, 2014

(65) Prior Publication Data

US 2015/0319231 A1  Nov. 5, 2015

(51) Int. Cl.
*H04L 12/931* (2013.01)
*H04L 29/08* (2006.01)
*H04L 49/00* (2022.01)
*H04L 67/1001* (2022.01)

(52) U.S. Cl.
CPC .......... *H04L 49/70* (2013.01); *H04L 67/1002* (2013.01)

(58) Field of Classification Search
CPC ...... H04L 12/56; H04L 67/1002; H04L 49/70
See application file for complete search history.

(56) References Cited

U.S. PATENT DOCUMENTS

| | | | | |
|---|---|---|---|---|
| 7,502,884 B1* | 3/2009 | Shah | .................. | H04L 67/1097 370/395.21 |
| 7,925,816 B2* | 4/2011 | Olesinski | ............ | G06F 13/4022 710/310 |
| 8,410,994 B1* | 4/2013 | Testa | .......................... | G06F 3/14 345/1.3 |
| 8,711,803 B1* | 4/2014 | Wang | .................. | H04W 36/023 370/206 |
| 2008/0069138 A1* | 3/2008 | Acharya | ............... | H04J 3/0632 370/468 |
| 2011/0029710 A1* | 2/2011 | Matthews | ................. | G06F 1/24 710/311 |
| 2011/0264732 A1* | 10/2011 | Robbin | ................... | H04L 12/66 709/203 |

(Continued)

OTHER PUBLICATIONS

Dan Conde; "Converged Infrastrcture vs Dissaggregated Systems"; https://www.networkcomputing.com/data-centers/converged-infrastructure-vs-disaggregated-systems/58685043; 2018.*

(Continued)

*Primary Examiner* — Tonia L Dollinger
*Assistant Examiner* — Jihad K Boustany
(74) *Attorney, Agent, or Firm* — Compass IP Law PC

(57) ABSTRACT

Method and apparatus for minimizing on-die memory in pull-mode switches. A disaggregated edge switch (DSW) includes a local communication interface including a plurality of outer ports configured to be coupled to a plurality of local hosts or servers via respective outer links, and a network interface configured to couple to at least one remote apparatus via a respective inner port and link. Data is transferred between the local hosts/servers using pull-mode transfers under which a receiver port "pulls" data from a local source port. The use of pull-mode data transfers between the local host/servers is managed by a scheduler so as to minimize the amount of buffers space for these local data transfers. Techniques are also disclosed for extending pull-mode data transfers using the Ethernet protocol over Ethernet links.

30 Claims, 11 Drawing Sheets

(56) References Cited

U.S. PATENT DOCUMENTS

| | | | | |
|---|---|---|---|---|
| 2012/0106560 A1* | 5/2012 | Gumaste | ................. | H04L 45/04 |
| | | | | 370/401 |
| 2014/0059266 A1* | 2/2014 | Ben-Michael | .......... | G06F 13/14 |
| | | | | 710/313 |
| 2014/0164669 A1* | 6/2014 | Coglitore | ............ | G06F 13/4022 |
| | | | | 710/316 |
| 2015/0381426 A1* | 12/2015 | Roese | ................. | H04L 41/0896 |
| | | | | 709/226 |

OTHER PUBLICATIONS

Tanjila Ahmed; "Resource Disaggregation for Virtual Data Center Provisioning in Optical Data Centers"; Slides 7-10; UC Davis; Apr. 21, 2017.*

Wikipedia; "Interface (Computing)"; https://en.wikipedia.org/wiki/Interface_(computing); Feb. 10, 2018.*

Dan Conde; "Converged Infrastrcture vs Dissaggregated Systems"; https://www.networkcomputing.com/data-centers/converged-infrastructure-vs-disaggregated-systems/58685043; 2018 (Year: 2018).*

Tanjila Ahmed; "Resource Disaggregation for Virtual Data Center Provisioning in Optical Data Centers"; Slides 7-10; UC Davis; Apr. 21, 2017 (Year: 2017).*

* cited by examiner

| Byte 1 | Byte 2 | Byte 3 | | Byte 4 | Byte 5 | Byte 6 | Byte 7 | Byte 8 | Byte 9 | Byte 10 | Byte 11 |
|---|---|---|---|---|---|---|---|---|---|---|---|
| | TPID | Info | | Workload 1 | Workload 2 | Workload 3 | Workload 4 | Workload 5 | Workload 6 | Workload 7 | Workload 8 |
| | | Port | L | | | | | | | | |

| Byte 1 | Byte 2 | Byte 3 | | Byte 4 | Byte 5 | Byte 6 | Byte 7 | Byte 8 | Byte 9 | Byte 10 | Byte 11 |
|---|---|---|---|---|---|---|---|---|---|---|---|
| | TPID | Info | | Grant 1 | Grant 2 | Grant 3 | Grant 4 | Grant 5 | Grant 6 | Grant 7 | Grant 8 |
| | | Port | L | | | | | | | | |

MINIMIZING ON-DIE MEMORY IN PULL MODE SWITCHES

BACKGROUND INFORMATION

In recent years, implementation of "cloud-based" services, high-performance computing (HPC) and other activities employing data centers and the like have seen widespread adoption. Under a typical data center installation, a large number of servers installed in server chassis and server racks are interconnected in communication using network links (e.g., Ethernet) and various switching mechanisms, such as switch blades/modules and "top-of-rack" (ToR) switches. Additional links, such as InfiniBand or Fibre Channel, are used for storage and other purposes.

Packet loss in data center networks requires retransmission of the dropped packets in the best case, and retransmission of the whole transaction in the worst case. Hence, packet loss impacts dramatically the effective end-to-end latency of transactions. This issue is even more acute when it concerns HPC or cloud traffic for which reducing end-to-end latency is a critical requirement.

Various approaches have been employed to reduce packet loss in data center networks. In Ethernet networks, packet loss over congested links can be avoided by issuing XOFF/XON notifications between peers. This involves alternately stopping traffic over the entire link or for a specific Traffic Class (TC) over a link. Other protocols like InfiniBand or Fibre Channel use a more sophisticated flow regulation mechanism over a link, which relies on pre-allocating credits to the sending-side and regularly renewing them according to the buffer space available at the receiving side. This has the advantage versus the XOFF/XON method to avoid provisioning buffer space at the receiving side for the worst case reaction time to XOFF notifications.

The two previous methods concerned local congestion avoidance mechanisms between two peers of a link. Data Center TCP (DCTCP) or Quantized Congestion Notification (QCN) protocols regularly issue congestion notification messages from the hot spots to the end nodes when buffers start to fill up, ahead in time before packet drop occur. As compared to XOFF/XON and local credit-based flow controls schemes, DCTCP and QCN provide the advantage of avoiding congestions to spread blindly over the whole fabric, as only the rate of congesting paths are reduced.

Under end-to-end bandwidth reservation approaches such as Resources Reservation Protocol (RSVP) or other TDMA-based bandwidth reservation protocols, bandwidth required for the transactions or for a connection oriented channel over the end-to-end path is reserved in advance. This results in opening end-to-end congestion free channels for traffic flows which are getting a share of the bandwidth available along the path from source to destination.

Another proposed approach comprising end-to-end credit-based flow control combines aspects of local flow control and bandwidth reservation schemes. Under this approach, credits are sent end-to-end over a whole disaggregated switch fabric. Assuming credits can always be refilled at the source in a timely manner, this method has the advantage to allow minimum end-to-end latency without relying on a control loop established over the fabric that could involve stability issues.

Each of the foregoing approaches is sub-optimal. Local flow control methods suffer from the side effect of congestion spreading. Whenever a single output queue in a switch gets full, further traffic which is received from any other port of the switch and which is destined to the congested port is either dropped or will built up in the other ports memory until they will get themselves congested. This phenomenon is referred as (blind) congestion spreading. This is temporarily blocking the network traffic's fluidity for flows which should normally not be impacted by the hot spots—generating crosstalk between congested and non-congested flows. In addition, the XOFF/XON flow control method used by the Ethernet protocol wastes a meaningful amount of internal buffer space to provision for the worst case reaction time of the peer to XOFF messages.

DCTCP requires the initial transmission rate of flows be set below the links' maximum speed, as the end-to-end rate control loop to be established needs some time to converge. As a result, sudden bursts of low latency traffic cannot be issued at full wire speeds (10 Gb/s, 40 Gb/s or 100 Gb/s), which leads to a spread over the time of transactions and flows, increasing end-to-end latency. QCN supports initial transmission rates at maximum link speeds, but it relies on local flow control methods to regulate traffic rate until the end-to-end rate control loop converges—if it converges. Thus, this method suffers from temporary congestion spreading effect associated with local flow control methods. These two end-to-end methods also require control traffic (Congestion Notification messages) be sent on a regular basis, wasting network bandwidth unnecessarily.

Bandwidth reservation methods cannot be used efficiently for sporadic bursts of connectionless low latency traffic (e.g., UDP traffic). Whenever the reserved bandwidth is not used, it is either simply wasted or it can be reused only by traffic that is tolerant to packet drops. The method is therefore non-optimal for HPC only or cloud-only environments where all (or almost all) the traffic is latency sensitive.

End-to-end credit-based flow control requires ANY destination port to provide in advance credits to ANY source port it may receive traffic from. These credits correspond to on-die buffer space that shall be provisioned at the destination port for ANY potential source port. The buffering capacity shall be large enough to store traffic for the worst case, where all the source ports are suddenly sending converging traffic to the same destination port, and this, cyclically in time over all the destination ports. Assuming the minimum amount of credits allocated per source port shall at least correspond to the Maximum Frame Size (MFS), the buffer capacity inside an N×N fabric shall be at least equal to, $$\text{MFS} \times \text{Number of source ports } (N-1) \times \text{Number of destination ports } (N)$$

Under a worst-case approach, the buffer capacity is 2×MFS×(N−1)×N. As a result, a large amount of on-die buffer space is required, which increases component costs and power consumption.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 8*a* and 8*b* respectively show exemplary data structures for a workload tag and grant tag used to facilitated data transfers using a pull mode over Ethernet;

DETAILED DESCRIPTION

Figure 1A:
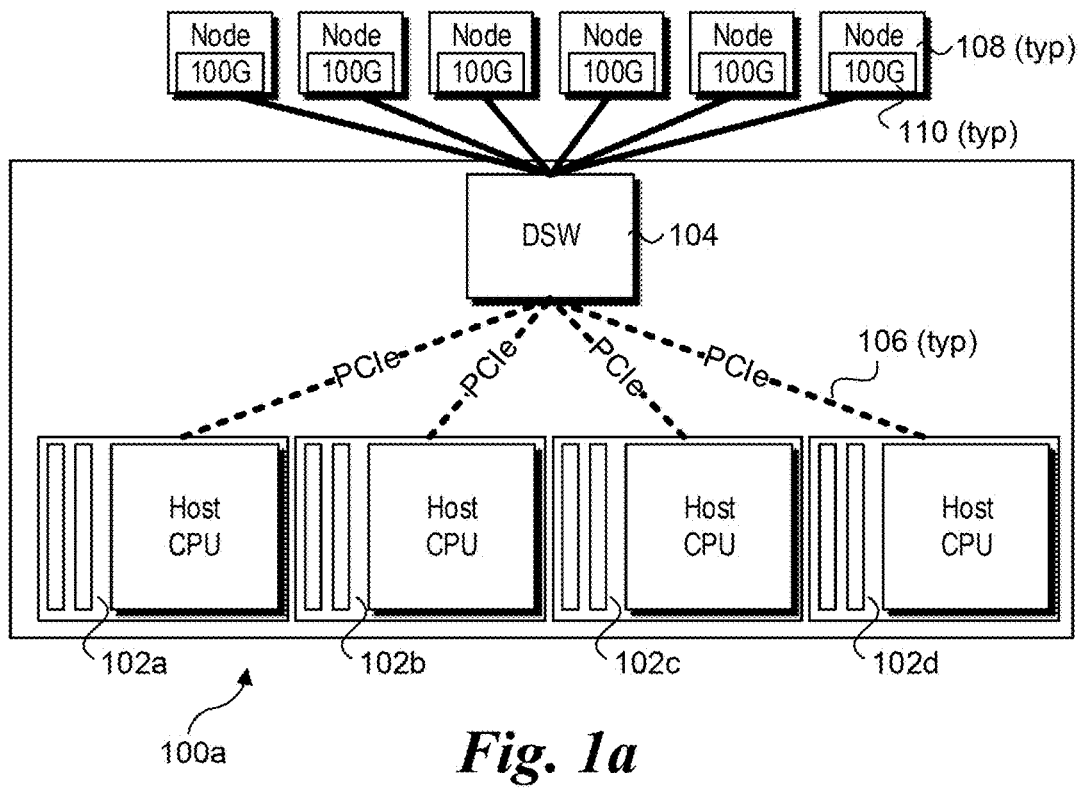
FIG. 1a is a schematic block diagram of a disaggregated switch (DSW) server include four servers linked in communication with a disaggregated switch via respective PCIe links.

Embodiments of methods and apparatus for reducing on-die buffer memory requirements in pull-mode switches are described herein. In the following description, numerous specific details are set forth to provide a thorough understanding of the embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, "pull mode" links and protocols are implemented to reduce the buffer requirements for associated networking components and equipment. In addition, the pull mode techniques are combined with disaggregated switch architectures to provide enhanced perform for low-latency environments such as HPC data centers.

The disclosed techniques takes advantage of switching environments where traffic is pulled and not pushed for minimizing the on-die memory required in switches. It is especially relevant between CPU (Central Processor Unit) end-nodes and the edge switches when they are organized according to the new "Disaggregated Switch" concept. Disaggregated switches are connected to CPU end-nodes through pull mode protocols that were originally run at the end-nodes between the host CPU and the NIC (network interface controller or card). One example is where extended multi-homed PCIe (Peripheral Component Interconnect Express) links are encapsulated over fiber cables between the end-nodes and the top-of-rack switch. Alternatively, other types of cables and switch configurations may be employed, including copper cables and blade switches, board switches, etc. Each end-node implements a different root complex, and each switch port is a different PCIe endpoint.

The Pull mode links run a protocol that allows one side to fetch traffic from the other—on its own initiative and from possibly several queuing options. This is in opposition to the conventional push mode protocols employed by Ethernet or other network protocols where one side sends traffic to the other on its own initiative and according to its own queue selection criteria.

In accordance with some embodiments, the pull-mode links and protocol are implemented in a disaggregated switch architecture, which is abbreviated herein as "DSW" in the drawing figures. Examples of aspects of disaggregated switch architectures are illustrated in various Figures herein. In one aspect, these architectures employ an extra level of local switch functionality that is separate from aggregated switching operations performed by a top-of-rack switch architecture that is commonly used in today's data centers. Under a conventional ToR architecture, one or more switches are (typically) located at the top of a rack (or elsewhere) that includes multiple server chassis, each including one or more physical servers, such as blade server chassis with multiple server blades or server modules. Under a typical ToR architecture, each of the physical servers is connected to the ToR switch via some communication link facility, such as an Ethernet copper cable or optical cable and associated network port components at each end of the link. In contrast, under a disaggregated switch architecture, server blades and modules within a rack chassis are enabled to communicate directly with each other without requiring switching functionality provided by a ToR switch or other switch external to the chassis.

FIG. 1*a* shows an embodiment of a disaggregated switch (DSW) server 100*a* including servers 102*a*, 102*b*, 102*c*, and 102*d* linked in communication with a disaggregated switch 104 via respective PCIe links 106. Disaggregated switch 104, in turn, is linked in communication to a plurality of network nodes 108 via respective 100 Gb/s (100G) Ethernet links 110, in one embodiment. Alternatively, Ethernet links 110 may comprise 10G, or 40G Ethernet links, as well as future Ethernet links employing higher wire speeds. In one embodiment, Ethernet links 110 comprises Silicon Photonics (SiPh) links, under which the Ethernet links employ a SiPh physical layer (PHY) and SiPh cabling. Alternative, Ethernet links 110 may employ copper wire PHYs or other forms of optical PHYs.

In accordance with one aspect, disaggregated switch 104 comprises an edge switch, and PCIe links 106 comprise pull-mode links that are referred to as "outer links" that are connected to local end-nodes comprising servers 102*a*-102*d*. Meanwhile, Ethernet links 110 between disaggregated switch 104 and external network nodes 108 comprise push mode links that are referred to as "inner links." As used herein, communication within a DSW server is referred to a "local," while communication between a server in a DSW server and an apparatus outside of the DSW server, such as another DSW server or ToR switch, comprises a remote communication. Accordingly, PCIe links 106 also correspond to local communication links, while Ethernet links 110 correspond to remote communication links.

Each of servers 102*a*, 102*b*, 102*c*, and 102*d* including a respective CPU 103. It is common to refer to the CPU of a server as a "host CPU" or simply a "host"; as used herein, the terms are interchangeable. The CPUs in the DSW server are also referred to as local hosts.

Figure 1B:
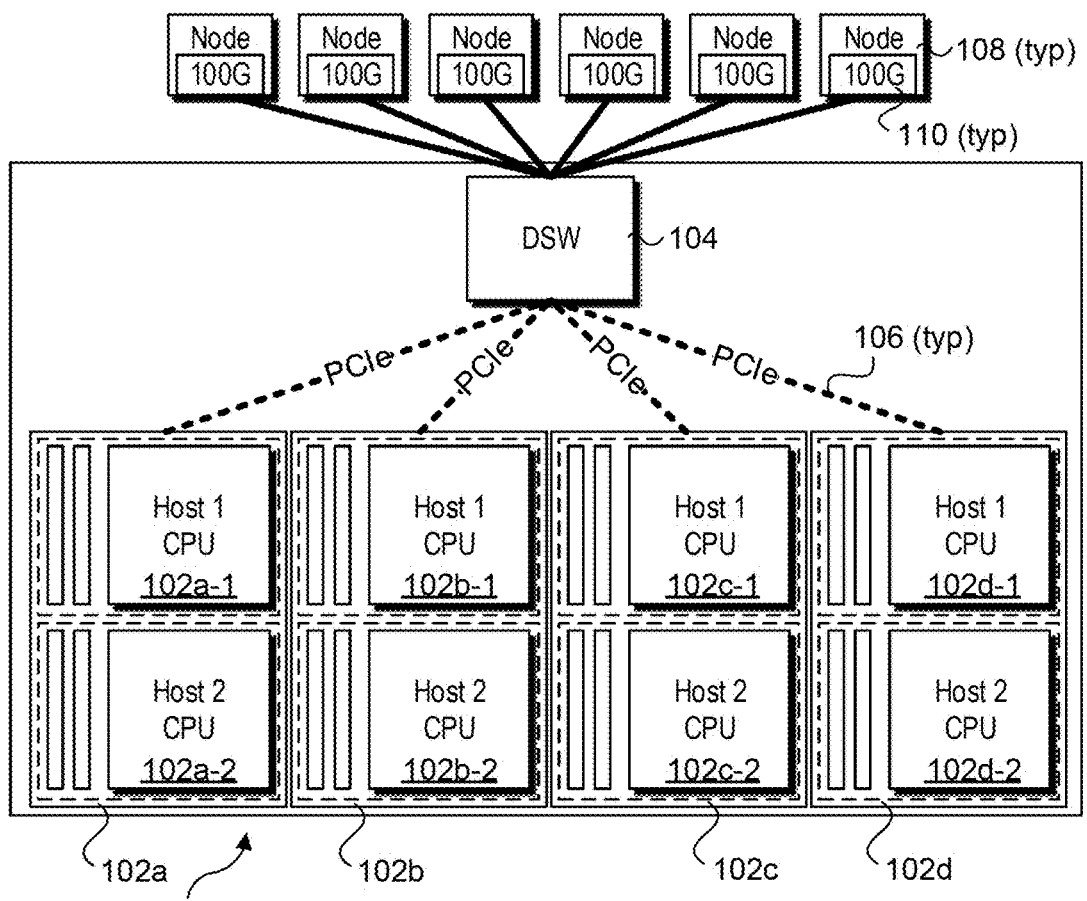
FIG. 1*b* is a schematic block diagram illustrating a modified version of the DSW server of FIG. 1*a* under which each server is a 2-socket server.

FIG. 1*b* illustrates a DSW server 100*b* comprising a variation of DSW server 100*a* under which servers 102*a*-*d* are depicted as multi-socketed servers. Under a multi-socketed server, each server's main board includes multiple CPU's, each associated with a separate set of resources (e.g., memory, operating system and applications, PCIe interconnect structure, etc.) For illustrative purposes, two sockets are shown for each of servers 102*a*-*d*, although it will be understood that a multi-socketed server may have other numbers of sockets, such as four. Each socket itself is operated as a separate server, and from a system perspective represents a separate host, while a socket-to-socket interconnect is provided that enables communication between the sockets. Accordingly, the CPU's are identified as Host 1 and Host 2, and are labeled with reference numbers such as 102*a*-1, and 102*a*-2 for server 102*a*. In one embodiment, as illustrated, Host 1 CPUs are connected to DSW 104 via respective PCIe links 106, while Host 2 CPUs access DSW 104 via a socket-to-socket interconnect between the two Host CPUs; alternatively, each of Host 1 and Host 2 CPUs could be connected to DSW 104 via a respective PCIe link (not shown).

In some embodiments, core functionality of disaggregated switch 104 is implemented as a System on a Chip (SoC) that includes various circuitry and logic to facilitate link communication and switching operations using a variety of inner link and outer link configurations. In other embodiments, the core functionality may be implemented via a plurality of discrete components, such as a separate switch chip coupled to one or more network interface chips. Generally, disaggregated switch 104 may be implemented as a module or board that is installed in a DSW server chassis and provides various physical interfaces to facilitate communication via the plurality of inner and outer links.

Figure 2A:
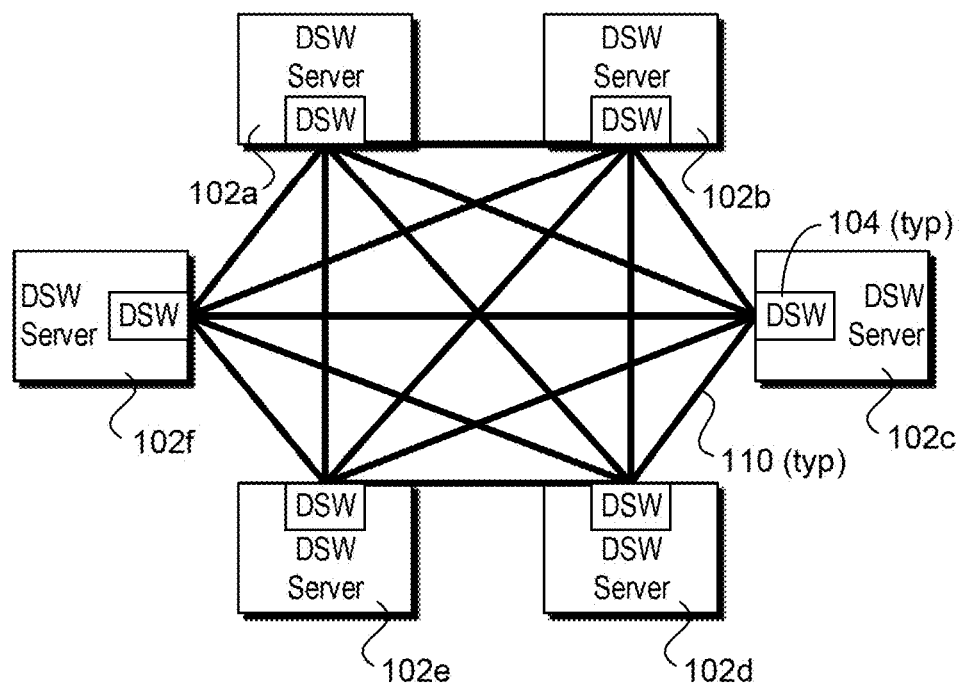
FIG. 2*a* is a diagram illustrating a plurality of DSW servers linked together via a fabric mesh of direct links.
Figure 2B:
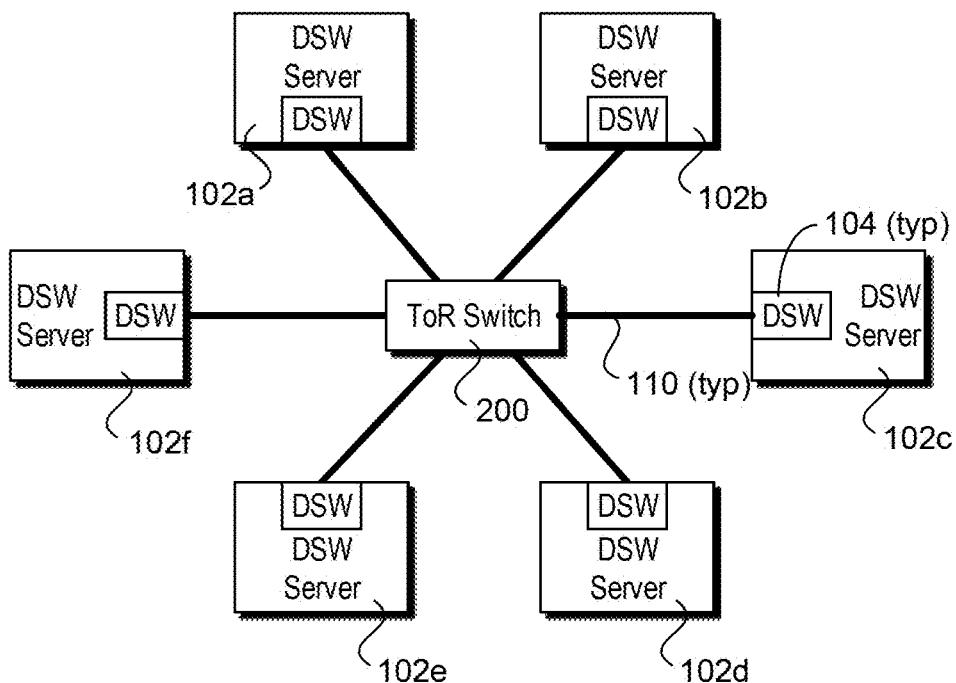
FIG. 2*b* is a diagram illustrating a plurality of DSW servers linked together via connections to a ToR switch using a star configuration.
Figure 3:
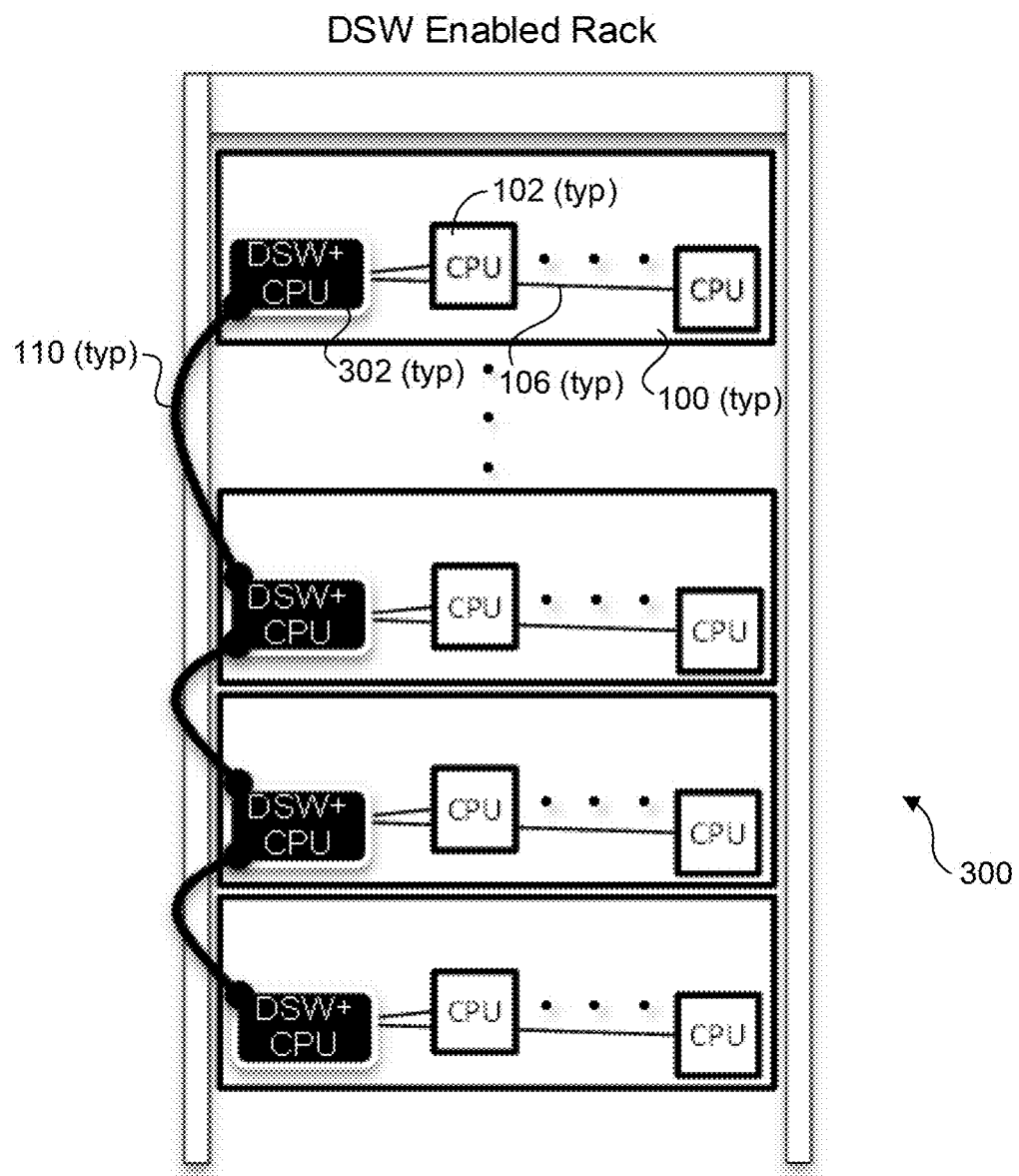
FIG. 3 is a diagram of a DSW-enabled rack including a plurality of DSW server chassis linked in communication using a daisy chain configuration.

DSW servers may be linked in communication to one another using various configurations. In some embodiments, disaggregated switches 104 support direct peer-to-peer inner links. FIG. 2*a* illustrates an exemplary configuration implementing peer-to-peer inner links, wherein six DSW servers 100*a*, 100*b*, 100*c*, 100*d*, 100*e*, and 100*f* are linked in communication via a mesh or fabric of inner links 110 (comprising 100G Ethernet links in one embodiment). Optionally, as shown in FIG. 2*b*, each DSW server 100*a*-*f* is linked in communication with a ToR switch 200 via a respective inner link 110 in a star configuration. As shown in FIG. 3, a plurality of DSW servers 100 in a DSW enabled rack 300 including disaggregated switch SoCs 302 that support peer-to-peer inner links are linked in a daisy chain manner via inner links 110. In addition to the configurations illustrated in FIGS. 2*a*, 2*b*, and 3, a combination of peer-to-peer and DSW server to ToR switch inner links topologies may be implemented, such as a ring, mesh, torus, etc.

Figure 4A:
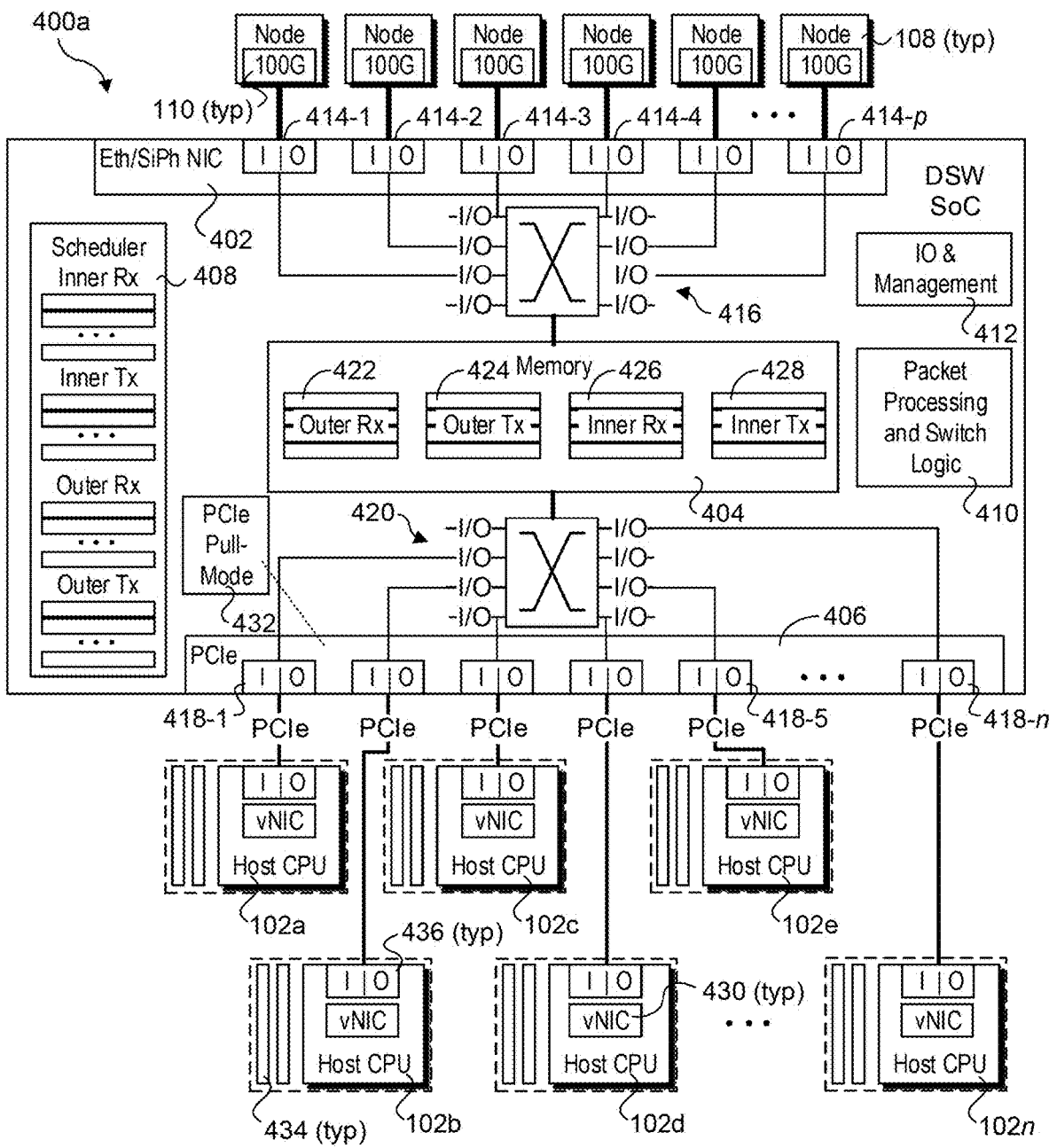
FIG. 4*a* is a schematic diagram of an embodiment of a disaggregated switch architecture using PCIe outer links and Ethernet inner links over a SiPh physical layer.

An architecture for a disaggregated switch 400, according to one embodiment, is shown in FIG. 4*a*. As illustrated, DSW 400 comprises an SoC that includes a network interface 402, memory 404, a PCIe interface 406, a scheduler 408, packet processing and switch logic 410, and an input/output (IO) and management block 412. Network interface 402 includes p inner ports 414-1 . . . 414-*p*, which are operatively coupled to memory 114 via applicable switching circuitry, as illustrated by a switch crossbar 416. In one embodiment, network interface 402 comprises an embedded Ethernet network interface controller (NIC). In one embodiment, the Ethernet NIC is configured to implement a SiPh PHY layer. This may be implemented on the SoC, or via one or more separate SiPh modules that are coupled to inner ports 414 (not shown). Each of inner ports 414-1 . . . 414-*p* is also depicted as including an input ('I') and output ('O') port, each of which includes applicable network interface components, including circuitry and logic for implementing the MAC layer of an Ethernet port, as well as local port buffers.

PCIe interface 406 includes n outer ports 418-1 . . . 418-*n* that are operatively coupled to memory 404 via application switching circuitry, as illustrated by a switch crossbar 420. Each of outer ports 418-1 . . . 414-*n* is also depicted as including an input and output port, each of which includes applicable components for implementing a PCIe port, and is connected to a respective server 102*a*-*n*.

IO and management block 412 contains logic for managing IO and other aspects of DSW operations. For example, this logic may be used for configuring network interface 402, and PCIe interface 406, as well as allocating various receive (Rx) and transmit (Tx) buffers in memory 404. For illustrative purposes, these buffers are depicted in FIG. 4*a* as an outer Rx buffer 422, and outer Tx buffer 424, an inner Rx buffer 426, and an inner Tx buffer 428.

Packet processing and switch logic 410 in combination with scheduler 408 is used to forward data internally within DSW 400 and schedule input and output of data via the inner and outer ports, and includes applicable forwarding table data (not shown). Packet processing generally includes operations relating to handling and forwarding packet data within a switch, such as packet header inspection, header modification, copying/moving data between receive and transmit buffers, etc., all of which are well-known to those skilled in the networking arts. Packet processing and switch logic 410 includes additional logic for handling two types of interfaces—an Ethernet interface and a PCIe interface. While both Ethernet and PCIe employ packet-based data transfers, the formatting and protocols are different. However, rather than converting between the two protocols, data comprising Ethernet packets are transferred between DSW 400 and servers 102*a-n* as data encapsulated in PCIe packets. To facilitate this, each of servers 102*a-n* includes software for implementing a virtual NIC (vNIC) 430 that is configured to send and receive Ethernet packet data over a local PCIe connection. When the PCIe packets containing encapsulated Ethernet packet data are received, they are decapsulated to extract the Ethernet packet data.

PCIe interface 406 is further depicted as including PCIe pull-mode logic 432. This logic facilitates PCIe pull-mode data transfers between servers 102*a-n* and DSW 400. Under PCIe pull-mode, data is "pulled" from memory 434 on the servers into outer RX buffer 422 using PCIe posted writes originating from PCIe interfaces 436 on servers 102*a-n* in response to pull-mode requests from PCIe interface 406.

The techniques employed by embodiments herein take advantage of the pull model for avoiding congestion between any two local end-nodes connected to the same disaggregated edge switch. It assumes that the queuing model at the host is made aware it is connected to a disaggregated switch, as detailed below. Current host transmit queuing models that are visible to NICs are segregated either per CPU thread, per Physical Function (PF), per Virtual Function (VF), per Virtual Machine (VM), per RDMA or FCoE (Fiber Channel over Ethernet) flow, per Traffic Class (TC), etc., or all at once. These transmit queuing models may be combined with the novel pull-mode transmit queuing models described herein.

In one embodiment the transmit queuing model at the host is segregated per the local Destination Ports in the disaggregated edge switch to which the CPU host is directly connected. Such a switch has at most several tens of outer ports to local end-nodes, and a similar number of inner ports to other edge switches or a ToR switch. This per-destination port transmit queuing does not exclude any other form of transmit queuing segregation be applied in parallel, for instance a transmit queue per thread (32) and per destination port (16), leading to 512 LAN transmit queues. RDMA transmit queues are per flow and are thus already finely segregated. Therefore they just need to be grouped in (at least) one pool per destination port in the first switch.

Figures 5, 7:
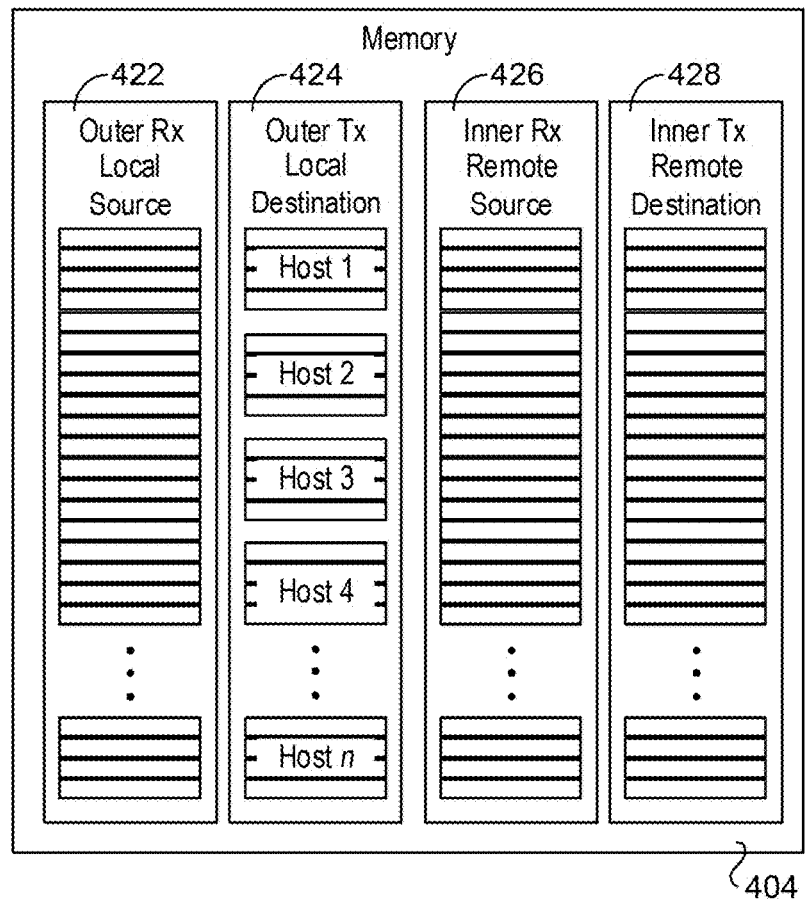
FIG. 5 is a diagram illustrating allocation of host memory into per destination transmit queues, according to one embodiment.
FIG. 7 illustrates an N×N matric used to track workload from local sources to local destination ports.

An example of per-destination port transmit queuing on Host 1 is shown in FIG. 5. Portions of memory 500 are allocated for a Tx buffer 502 and a receive buffer 504. For illustrative purposes, each of the Tx and Rx buffers are depicted as contiguous blocks of memory. In practice, one or more of these buffers may employ discontinuous blocks of memory. Moreover, as is common, the actual management of data in the buffers may be handled via pointers rather than the memory locations themselves. For example, it is common to have a set of FIFO (First-in, First-out) pointers for data within a buffer for each of various levels of segregation (e.g., a separate FIFO for each queue).

Tx buffer 504 contains data (e.g., packet data) that is destined for a remote destination or another local host within the DSW server. Accordingly, at a first level of segregation, a first portion 504 of the Tx buffer space is partitioned into multiple transmit queues that are segregated on a per-(local) destination port basis, such as depicted in FIG. 5, where in the location destination ports are identified by their Host number. Meanwhile, the remaining portion 506 of the Tx buffer space is allocated for transmit queues corresponding to remote (outside the server) destinations). As discussed above, each of these per-destination port transmit queues may further be partitioned into one or more additional levels of segregation to support one or more of per CPU thread, per PF, per Virtual VF, per VM, per RDMA or FCoE flow, per TC, etc. Additionally, various transmit and receive queues will be dynamically allocated for portion 506 of Tx buffer 502 and Rx buffer 504; these queues are not shown in FIG. 5 for simplicity and clarity, but will be understood to exist.

As will be recognized by those skilled in the networking arts, data is physically or logically moved between receive and transmit queues using one or more of memory writes, memory copies or pointer updates. For example, under a memory copy data in a receive buffer is written to a transmit buffer, while under a logical move the data itself stays in place while pointers to the data are updated to effect a move from a receive buffer to a transmit buffer. In addition, other memory buffers may be present on the DSW SoC, such as memory buffers/queues in each of the inner and outer ports, such as per port virtual input queue and per virtual output port queues. For example, on the PCIe outbound side (outer port to a local server/host destination), packet data in an Ethernet packet is transferred to the destination PCIe port via one or more PCIe writes.

Once transmit queues are segregated by destination port in the host, the edge switch level scheduler implemented in the DSW fetches data from a host queue only if the destination link is currently free, or is assumed to be free once the data will reach the switch, in accordance with the pull model. Other queue selection criteria may be used in parallel, such as PF bandwidth, TC bandwidth, etc., as before.

Scheduling Model

Under some embodiments, incoming traffic received from the internal ports of the disaggregated edge switch will (generally, if not always) have precedence and/or a higher service rate over local traffic exchanged between two end-nodes directly connected to the edge switch. This will ensure that occupancy in the internal buffers of the edge switch will not grow up due to the pushed traffic received from the inner ports. Also, multicast traffic received from inner ports has precedence over the unicast traffic received from these ports. This will allow quicker release of the internal data buffer occupied by this inner multicast traffic.

Preferably, if for some reason traffic received from an inner port cannot be forwarded in a timely manner and starts to accumulate inside the edge switch's internal buffer, local flow control is issued to the inner port's peer. Unlike in the legacy case, such inner flow control will not cause congestion spreading over the disaggregated switch because here the other edge switches will simply stop scheduling traffic to the congested port and will rather PULL traffic destined to other inner or outer ports which are not currently congested. The local flow control can use either XOFF/XON model or a credit-based model.

Figure 6:
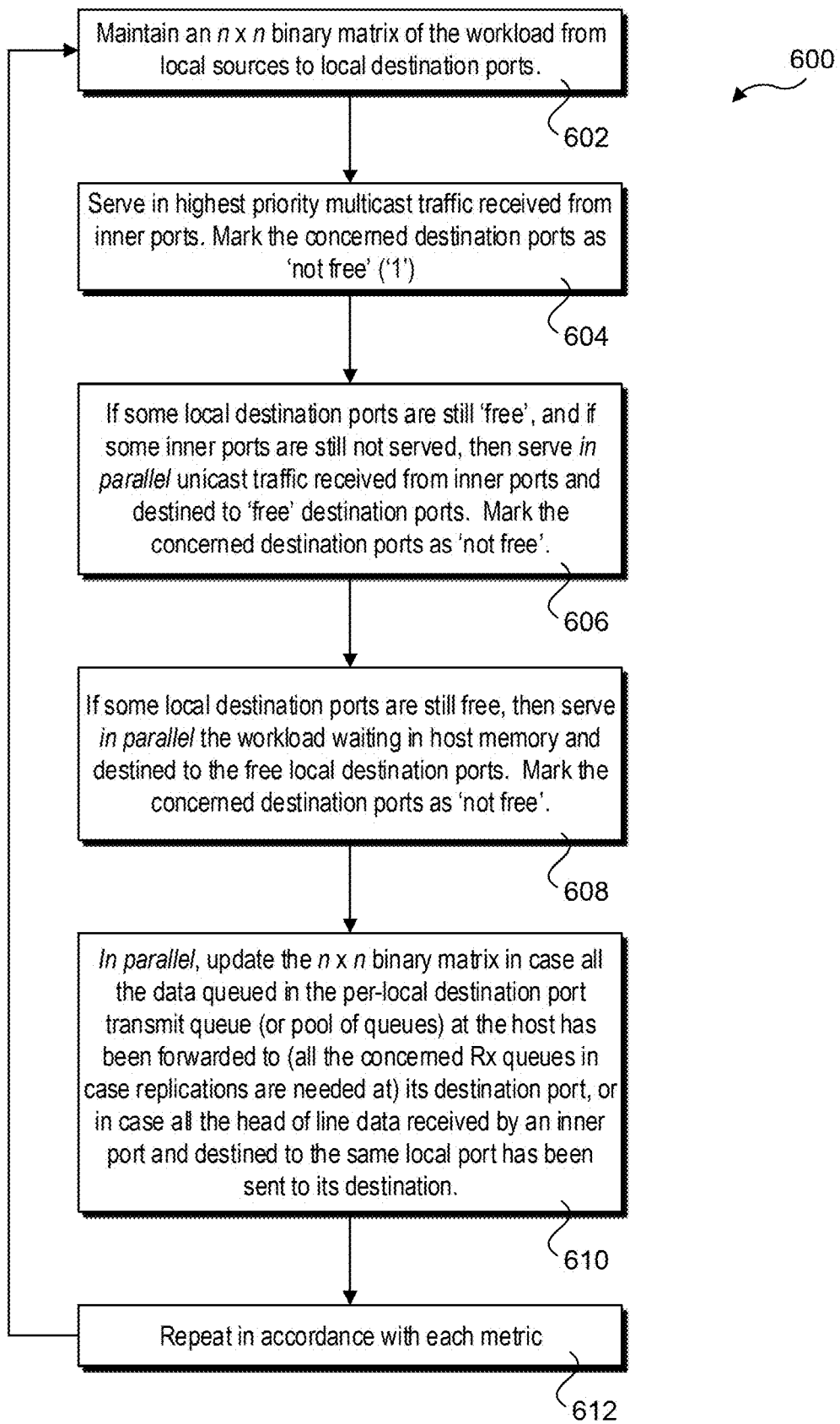
FIG. 6 is a flowchart illustrating operations implemented by an edge switch level scheduler, according to one embodiment.

In one embodiment, the following edge switch level scheduler flow, which is illustrated in a flowchart 600 of FIG. 6, can be run by every edge switch in parallel in order to achieve a lossless scheduler with minimum end-to-end latency and required on-die buffering. The following assumes the edge switch has N total ports (number of inner ports plus outer ports).

As depicted in a block 602, an N×N binary matrix is maintained to track the workload from the local sources to the local destination ports. As depicted in FIG. 7, an N×N matrix 700 includes cells located at i (row), j (column) containing either a '1' or a '0'. A '1' indicates there is traffic waiting to be scheduled from a local source port i to a local destination port j. A '0' indicates there is no traffic queued (either in host memory or inside the edge switch's internal memory) the local source port i to the local destination port j.

In a block 604, the highest priority multicast traffic received from the inner ports is served in to be forwarded to applicable destined DWS servers. The concerned destination ports are marked as 'not free.' As shown in FIG. 7, in one embodiment there is a row 702 above the N×N matrix that is used for indicating whether a destination port is 'free' ('0') or 'not free' ('1'). In a block 606, if some local destination ports are still 'free', and if some inner ports are still not served, then parallel unicast traffic received from inner ports and destined to 'free' destination ports is served in. As before, the concerned destination ports are marked as 'not free'. As depicted in a block 608, if some local destination ports are still free, then the workload waiting in host memory and destined to the free local destination ports is served in parallel. The concerned destination ports are again marked as 'not free'.

In a block 610, the N×N binary matrix is updated in parallel in case all the data queued in the per-local destination port transmit queue (or pool of queues) at the host has been forwarded to (all the concerned Rx queues in case replications are needed at) its destination port, or in case all the head of line data received by an inner port and destined to the same local port has been sent to its destination.

As shown in a block 612, the operations of blocks 602, 604, 606, 608, and 610 may be repeated for each metric to be considered when forwarding network traffic via the disaggregated switch. For example, such metrics may include but are not limited to TC bandwidth, PF bandwidth, etc.

It is assumed that multicast traffic is posted by the host into all the concerned transmit queues. The same data buffer will be pointed to by all the concerned transmit descriptor queues. The data buffer is released once all the concerned transmit queues have sent the data.

Software drivers can be made aware of the number of ports N in the edge switch (inner and outer ports altogether) via some LLDP (Link Layer Discovery Protocol) or other control messages exchanged with the edge switch. This will allow the host to segregate transmit queues accordingly. Alternatively, this number can be preset in a host's non-volatile memory.

Generally, the operating system (OS) stack and/or driver can learn the destination port (local to the edge switch) of a transmit flow via ARP or any other address resolution protocol in use. The edge switch captures ARP replies and inserts the originating local port number into it or into a dedicated proprietary messaging exchanged with the host. In this way, the driver knows to which transmit queue data is to be queued. In return, the edge switch can be made aware of the local destination port of a transmit queue via the queue doorbell, via a configuration and status register, or via an item stored in the queue context.

Reduction in Required On-Die Memory

Under the teachings and principles disclosed herein, the on-die memory requirements are substantially reduced when compared with existing conventional approaches. As discussed above, for a worst case approach under end-to-end credit-based flow control, the buffer capacity is 2×MFS×(N−1)×N. For Ethernet and FCoE traffic, MFS is 2 KB—assuming Jumbo Frames are not supported. Disaggregated ToR switches are aimed to aggregate tens of 10G or 40G ports, typically 48 to 96. This results in on-die buffering capacity of at least 9 MB to 18 MB being required across the disaggregated ToR switches. This has a significant impact in both cost and power for the DSW chips proposed for use in HPC and Cloud environment.

By comparison, embodiments disclosed herein dramatically reduce the required on-die memory. For example, assume the whole disaggregated ToR switch is to support p DSW edge switches, and each edge switch has n outer-ports and p inner ports. Then the total number of end-nodes connected to the disaggregated switch is N=p×n. Each DSW edge switch needs (on-die) buffering capacity for one MFS per local end-node n, and two MFS per inner port p for a credit-based flow control method used between inner ports. Thus, the following buffering capacity is needed per edge switch:

$$MFS \times (n+2 \times p)$$

The total buffering capacity needed for the whole disaggregated switch is:

$$MFS \times (n+2 \times p) \times p = MFS \times (N+2 \times p^2)$$

As before: MFS=2 KB, N=48 to 96. Suppose p=6, and n=8 to 16. The resulting total on-die buffering capacity needed is only 240 KB to 336 KB vs. 9 MB to 18 MB under the conventional approach. The results in a reduction of 97% of required on-die memory, a very significant savings.

There are also additional benefits to the novel techniques illustrated by the embodiments disclosed herein. Congestion spreading is avoided, saving network bandwidth and reducing end-to-end latency. Sudden bursts of low-latency traffic are enabled to be served at full wire speed, reducing transaction latency. The techniques do not require control messaging to be exchanged between end nodes on a regular basis, further saving network bandwidth. Waste of bandwidth associated with bandwidth reservation methods is also avoided, particularly in environments where all the traffic is low latency and shall be bandwidth provisioned.

Extending Pull Mode to Ethernet

Ethernet employs a Push mode model under which Ethernet sources push traffic toward Ethernet destinations and does not provide any inherent capability for supporting a Pull model. Under embodiments described here, modifications to the standard Ethernet protocol are provided to extend Ethernet to support Pull-mode type functionality similar to that supported by PCIe. In addition to the extensions to the Ethernet protocol, pull-mode functionality is facilitated via some modifications in the way a NIC selects packets for transmission. For example, the NIC repeatedly reports to the switch its current workload, e.g., the list of edge switch ports to which the NIC has pending Tx traffic, and the amount of pending traffic for each. In one embodiment, the information is conveyed to the switch by piggy-backing every Tx frame, carrying it over a Layer2 tag for instance. In return, the edge switch will send grant notifications to the NIC to notify it of the ordered list of granted destination ports and the amount of traffic granted for each slot.

The information can be conveyed between the NIC and the switch through a combination of two methods:

1. Piggy-backing on every frame transmitted to the peer, carrying it over a new Layer2 tag for instance.
2. Sending a new type of Layer2 MAC control frame whenever there is no frame to be sent to the peer.

Exemplary embodiments of a workload tag 800 and a grant tag 802 are shown in FIGS. 8a and 8b. As a baseline configuration, it is assumed that the maximum number of ports (outer and inner ports altogether) in an edge switch is bounded to 32 ports. The ports are indexed from 0 to 31. For reducing the overhead per frame, the NIC workload information can be fragmented into fragments that are conveyed over several consecutive frames, one fragment per frame over workload tag 800.

Each fragment of workload information is made of one Info byte and a varying number of Workload fields, between 0 and 7, each one byte in length. The number of Workload fields appended after the Info byte is announced in the Length (L) field of the Info byte. Each Workload field reports the workload to a port in the edge switch, where the port index is cyclically incremented by one on every successive Workload field. The Port field in the Info byte contains the port index of the first Workload field. Each Workload field reports the workload to a successive destination port in the edge switch, expressed in 64-byte units. The workload reported is cumulative, which means that a Workload field reports new Tx traffic that has been posted by the host since the last Workload field relative to the same port has been sent.

The longest NIC to switch tag contains 11-bytes (see below), while the shortest tag is 4-bytes in length. The use of workload tag 800 is optional, and may not appear in a Tx frame whenever no new workload has been posted by the host. Further details of workload tag 800 are as follows:

TPID=Two bytes of Protocol ID. This would be detected by the Ethernet NICs, as modified to support the pull-mode Ethernet extension.

Port (5-bits)=Index of the port in the edge switch to which the Workload 1 field relates. Workload 2 is relative to [Port+1], Workload 3 to [Port+2], and so forth in a cyclic manner up to the number of ports in the edge switch.

L (3-bits)=Length, represents the number minus one of subsequent Workload fields. 0 means one Workload field follows; 1 means two Workload fields follow; 2 means three Workload fields follow; and so forth up to a maximum of 8 Workload fields encapsulated in a tag.

Workload[i]=New amount of traffic posted by host and that is destined to the corresponding port in the edge switch. It is expressed in 64-bytes units of Layer2 payload. Workload[i] is relative to the port index given by [Port+i−1]. The amount of 64-byte units posted by host since the last report for the port is given by the corresponding Workload field. The NIC can report an additive workload of 64-bytes up to 4-Kbytes minus one byte, with a granularity of 64-bytes. In case the amount of pending workload is not a multiple of 64-bytes, the Workload field reported is rounded up. However, the NIC handles a byte-accurate accountability of the Layer2 bytes transmitted versus reported per each destination port in the edge switch.

The maximum amount of currently pending bytes in the NIC which are destined to a (local) port in the edge switch is the sum of the workloads reported each time for the port, minus the amount of bytes sent to the edge switch for this (local) destination port.

In case a workload report is lost and is therefore not granted by the switch (e.g., bad frame CRC), the associated traffic is not transmitted until the NIC detects the situation and resends a workload report for the residual pending traffic. The NIC can detect such a situation whenever it stops receiving grant notifications from the switch (no grant tag present and no L2 MAC control grant frame) in spite it has pending workload reports that were not granted by the switch. The NIC is not allowed to send any Layer2 payload traffic to the switch before it has been granted.

In case the NIC has no Tx frame to be sent to the switch or if it is not allowed to send them, it can encapsulate several workload tags, one after the other, within a single L2 MAC control workload frame, padding the frame if necessary up to the minimum of 64-bytes as required by Ethernet. Such a control frame is interpreted by the switch as if it has received several workload tags piggy-backed over successive Tx frames.

The situation where the workload has to be reported before Tx frames are pending for transmission in the NIC is made possible if the host bumps the tail into the Tx queue registers of the NIC with the number of newly posted Layer2 bytes. The NIC can thus issue a report to the switch in the meantime it fetches the Tx descriptor and data from host memory. This is compensating for the extra latency in Tx involved by the report/grant exchange needed before issuing traffic to the switch.

In response to the workload reports received from the NIC, the edge switch returns the amount of traffic granted per each local destination port, e.g., grant notifications. In one embodiment, this is accomplished by piggy-back over grant tag 802 (and via small Layer2 control packets in case the switch has no traffic to be sent to the NIC).

The number of Grant fields appended after the Info byte is announced in the Length (L) field of the Info byte. Each Grant field notifies the amount of granted traffic to a port in the edge switch, where the port index is cyclically incremented by one on every successive Grant field. The Port field in the Info byte contains the port index of the first Grant field. Each Grant field notifies the amount of granted traffic to a successive destination port in the edge switch, expressed in 64-bytes units. The grant notifications are ordered, which means that the NIC shall consume non-null grants (i.e., transmit traffic to the switch) in the same order the non-null grants are received.

The longest switch to NIC tag contains 11-bytes (see below), while the shortest tag is 4-bytes in length. In one embodiment, this grant tag is present (even with all zero grants) in any Rx frames until all workload reports received have been granted. That way, Rx frames with no grant tag present are used by the NIC as an indication of lost workload tags in case the NIC has pending un-granted workload reports that has been issued to the switch. Further details of Grant tag 802 fields include the following:

TPID=Two bytes of Protocol ID. In one embodiment, the same tag can be used in both directions, assuming each peer knows its type NIC/switch.

Port (5-bits)=Index of the port in the edge switch to which Grant 1 field relates. Grant 2 is relative to [Port+1], Grant 3 to [Port+2], and so forth in a cyclic manner up to the number of ports in the edge switch.

L (3-bits)=Length, represents the number minus one of subsequent Grant fields. 0 means one Grant field follows; 1 means two Grant fields follow; 2 means three Grant fields follow; and so forth up to a maximum of 8 Grant fields encapsulated in a tag.

Grant[i]=New amount of traffic granted by the switch and that is destined to the corresponding port in the edge switch. It is expressed in 64-byte units of Layer2 payload, plus one unit. Grant[i] is relative to the port index given by [Port+i−1]. The amount of 64-byte units granted since the last notification for the port is given by the corresponding Grant field. The switch can notify a new grant of 0-bytes up to 4-Kbytes minus one byte, with a granularity of 64-bytes. The Grant field notifies only up to the amount of 64-byte units of workload reported by the NIC—no free grant issued to the NIC. The switch handles a byte-accurate account of Layer2 bytes received by the NIC versus granted, per each destination port in the edge switch.

The total amount of currently granted bytes destined to a (local) port in the edge switch is the sum of the grants notified for the port, minus the amount of bytes sent by the NIC to the edge switch for this (local) destination port.

In case the switch has no Rx frame to be sent to the NIC and there are still un-granted workload reports from the NIC, the switch shall encapsulate several grant tags one after the other within a single L2 MAC control grant frame, padding the frame if necessary up to the minimum of 64-bytes as required by Ethernet. Such a control frame is interpreted by the NIC as if it has received several grant tags piggy-backed over successive Rx frames.

In one embodiment, whenever the switch does not want to grant any pending workload, it will insert a grant tag in Rx frames issued to the NIC and will issue L2 MAC control grant frames, both with at least one zeroed Grant field. Otherwise, if the switch issues no grant tag and no grant frame for at least the worst case round trip time between the peers, the NIC will resend the workload reports that were not granted so far, since they are considered to correspond to lost reports or lost grants. In one embodiment, the switch shall not insert a grant tag or a grant frame to the NIC if it has no pending un-granted workload report left for the NIC.

In one embodiment, the NIC is configured to handle several byte-accurate counters per destination port in the edge switch:

1. The amount of pending traffic, e.g., traffic posted by the host that has not been transmitted yet.
2. The amount of pending traffic that has not been reported to the switch yet.
3. The amount of pending traffic reported to the switch that has not been granted yet.

This counter value is added to the previous counter whenever no grant tag and no grant frame is received from the switch for at least the worst case round trip time.

The switch handles one byte-accurate counter per NIC port by each destination port in the edge switch: The amount of traffic reported by the NIC port for the destination port that has not been granted yet.

The switch can estimate the average delay since a grant is issued to the NIC and the time it receives the corresponding traffic in return. This average delay measured and stored per each outer port is useful for the scheduling algorithm run by the edge switch across its n outer ports.

The formats of the workload tag and grant tag described herein and shown in FIGS. 8a and 8b are illustrative of one way of encapsulating information exchanged between the NIC and the switch. Other encapsulation methods may also be used, as will be recognized by those having skill in the networking arts.

Exemplary DSW Server Environments

Figure 9:
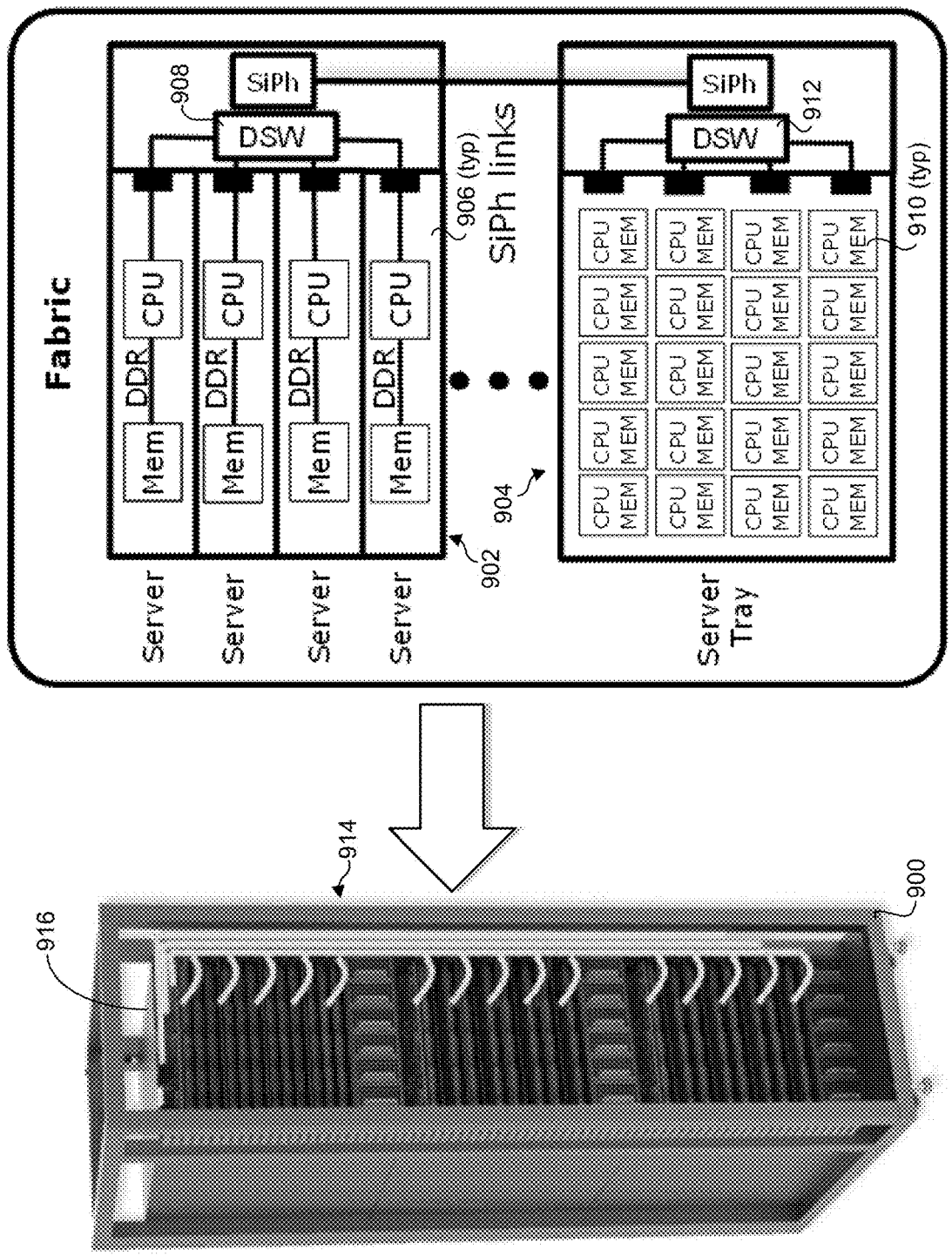
FIG. 9 is a schematic diagram illustrating a rack-level architecture employing server chassis with disaggregated edge switches coupled via SiPh links.

FIG. 9 shows an exemplary rack server environment in which aspects of the embodiments disclosed herein may be implemented. The environment includes a rack 900 including a plurality of slots in which respective server chassis are installed, including server chassis 902, microserver chassis 904, and, optionally, other types of rack chassis, such as storage chassis. It is noted that rack 900 generally may be populated with a mixture of server chassis 902 and microserver chassis 904, only server chassis 902, or only server chassis 906. Server chassis 902 includes a plurality of servers 906, each communicatively coupled to a disaggregated switch 908. Microserver chassis 904 includes one or more server trays in which a plurality of microservers 910 are installed, each communicatively coupled to a disaggregated switch 912. The disaggregated switches 908 and 912 in server chassis 902 and microserver chassis 904 are communicatively coupled via SiPh links 914. SiPh links are also employed to connect at least a portion of the servers and/or microservers to a ToR switch 916.

Figure 10B:
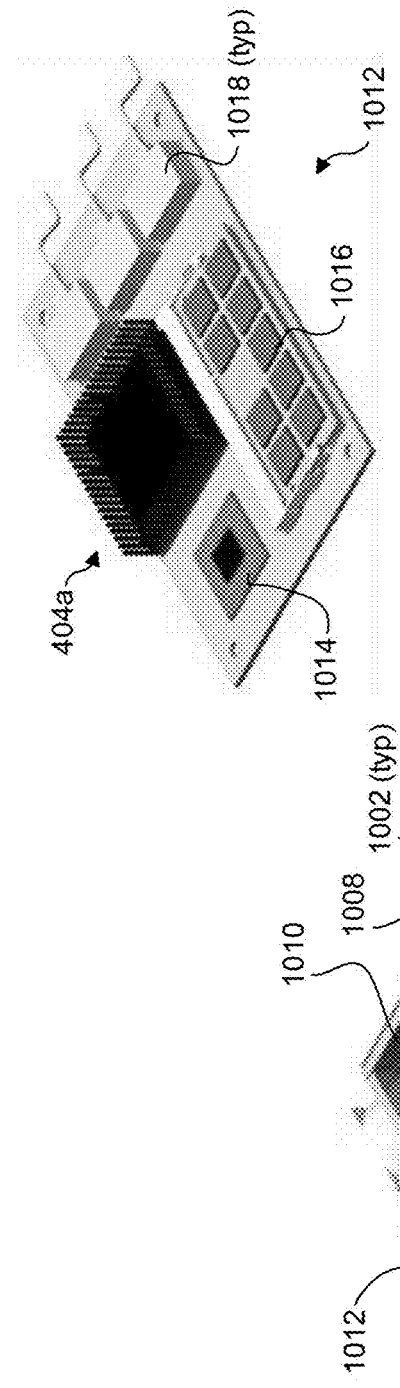
FIGS. 10*a* and 10*b* illustrate a DSW server including four 2-socket servers and a disaggregated switch mezzanine card communicatively coupled to the servers via PCIe links, according to one embodiment.
Figure 10A:
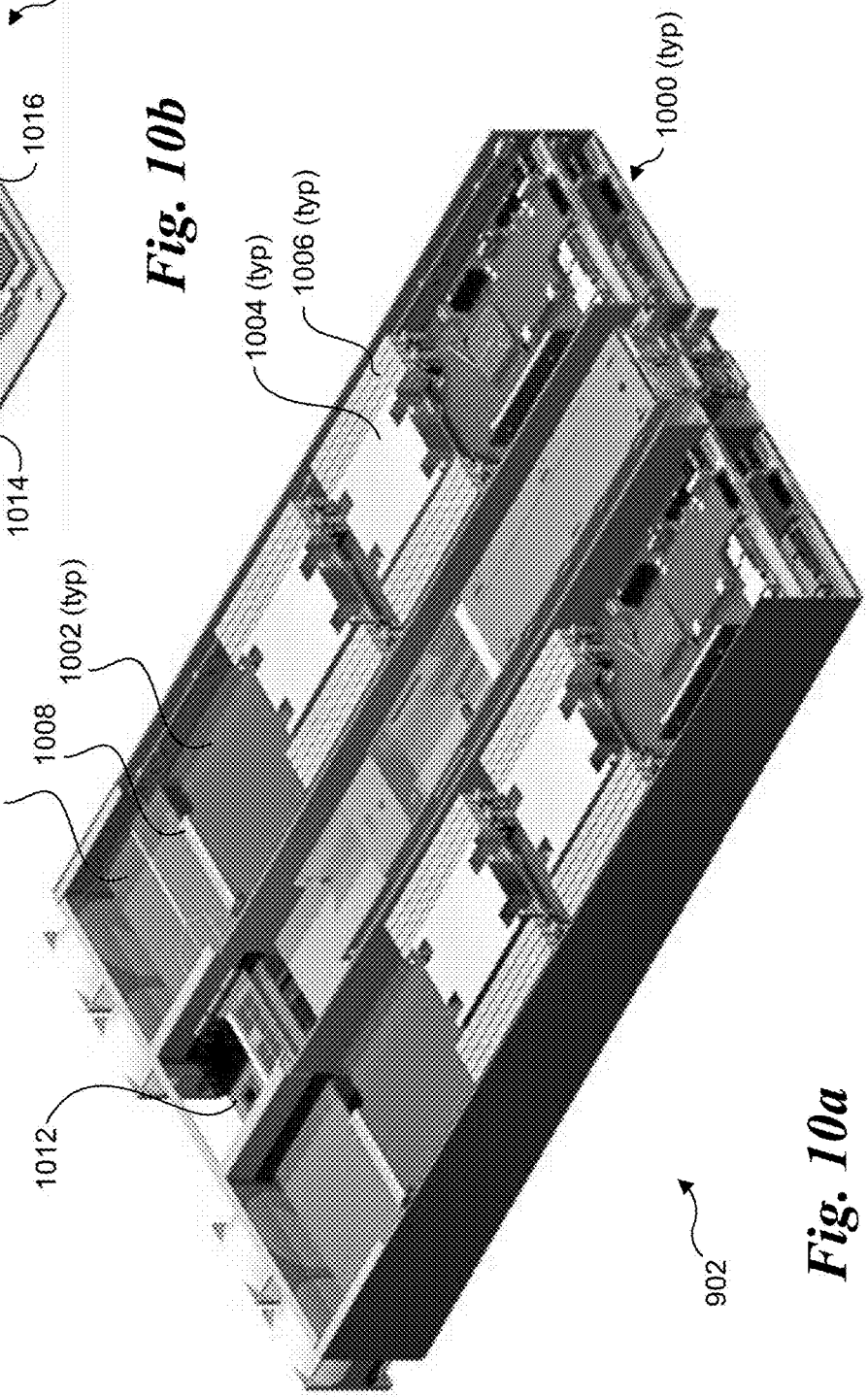

FIGS. 10a and 10b show further details of a server chassis 902, according to one embodiment. Server chassis 902 includes four 2-socket servers 1000, each including a main server board 1002 having two sockets in which respective CPUs 1004 are installed. Also mounted on main server board 1002 are a plurality of DIMM connectors in which respective DIMM memory modules 1006 are installed. In addition, each socket will include its own set of resources, and is configured to be operated independent of the other socket. At the same time, data transfer between sockets is facilitated via a socket-to-socket interconnect, such as a Intel® QuickPath Interconnect (QPI). When data is pulled from memory in a host in a multi-socketed server that is not directly connected to the DSW, the data is forwarded via the socket-to-socket interconnect to a host that is directly connected to the DSW.

Each main server board 1000 includes an edge connector or multi-pin connector at its rear that is coupled into a mating connector 1008 that is mounted to a backplane board 1010. Disaggregated switch 908 is implemented on a mezzanine card 1012 that is communicatively coupled to backplane board 1010. Mezzanine card 1012 includes a DSW SoC 400a, a CPU 1014, a memory module 1016, and a plurality of SiPh modules 1018. In the illustrated embodiment, SiPh modules 1018 and corresponding SiPh PHY interface circuitry on DSW SoC 400 facilitate 12 transceiver lanes; however, this is merely exemplary, as other numbers of SiPh transceiver lanes may be implemented.

Generally, PCIe interfaces may be integrated on CPUs 1002 using an SoC-type architecture, or they may be included in a separate chip, such as an input-output hub (IOH) chip coupled to the CPU. The PCIe links are facilitated via wire traces in main server board 1002, backplane board 1010, and mezzanine card 1012. The number of PCIe lanes that are implemented may vary, depending on the particular server/system requirements. For example, the PCIe links may comprise PCIe 3.0 or later x1, x2, x4, x8, x16, or x32 links.

Figures 11A, 11B:
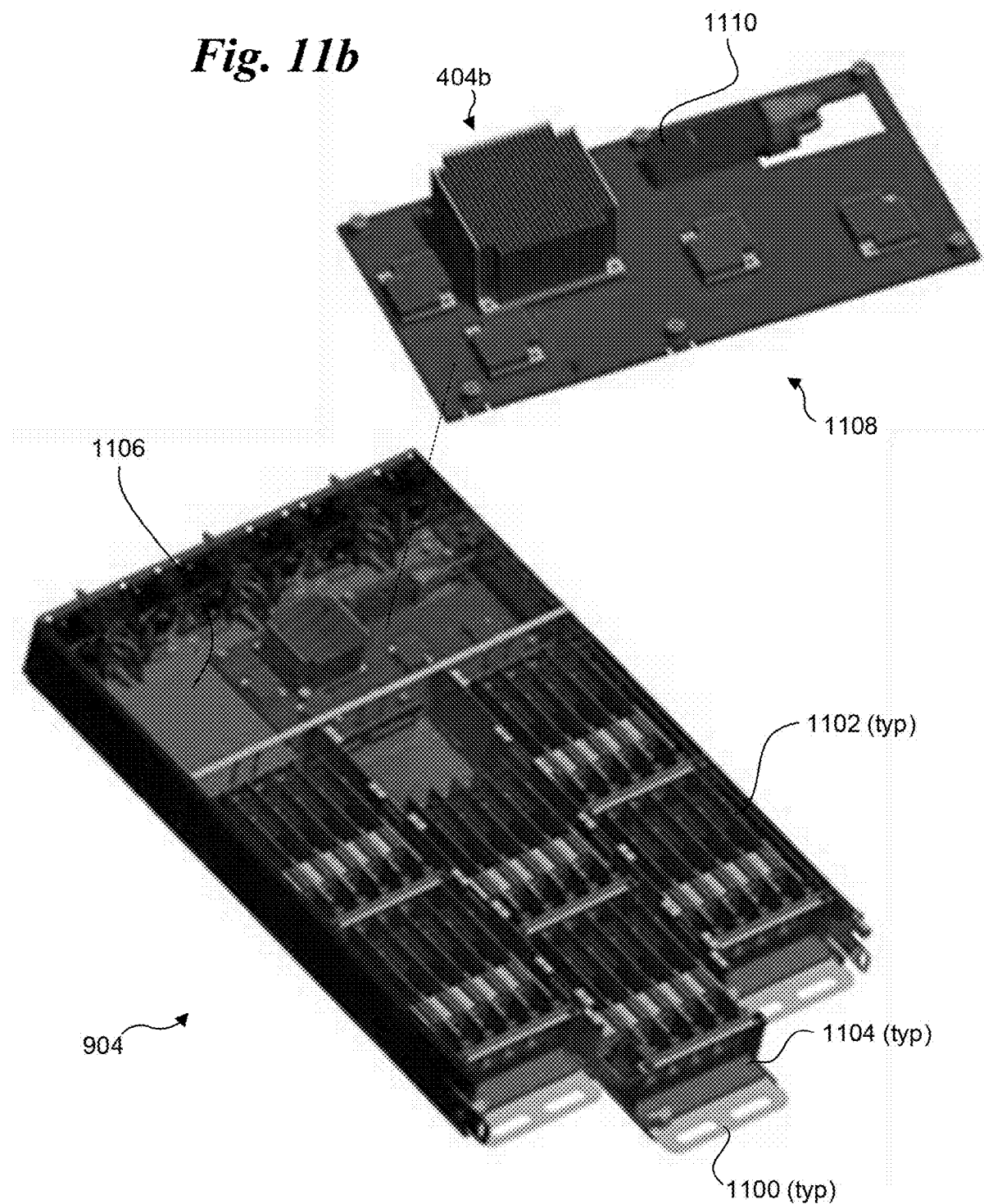
FIGS. 11*a* and 11*b* illustrated a DSW server including a plurality of microservers and a disaggregated switch mezzanine card communicatively coupled to the microservers via backplane Ethernet links, according to one embodiment.

FIGS. 11a and 11b show further details of a microserver chassis 904, according to one embodiment. Microserver chassis 904 includes three microserver trays 1100, each including a plurality of microserver boards 1102 coupled to connectors in a backplane 1104. At the rear of each backplane is a connector that is coupled into one or more of a power distribution board 1106 and a DSW mezzanine card 1108 including an SiPh module 1110 and a DSW SoC 400b.

Figure 4B:
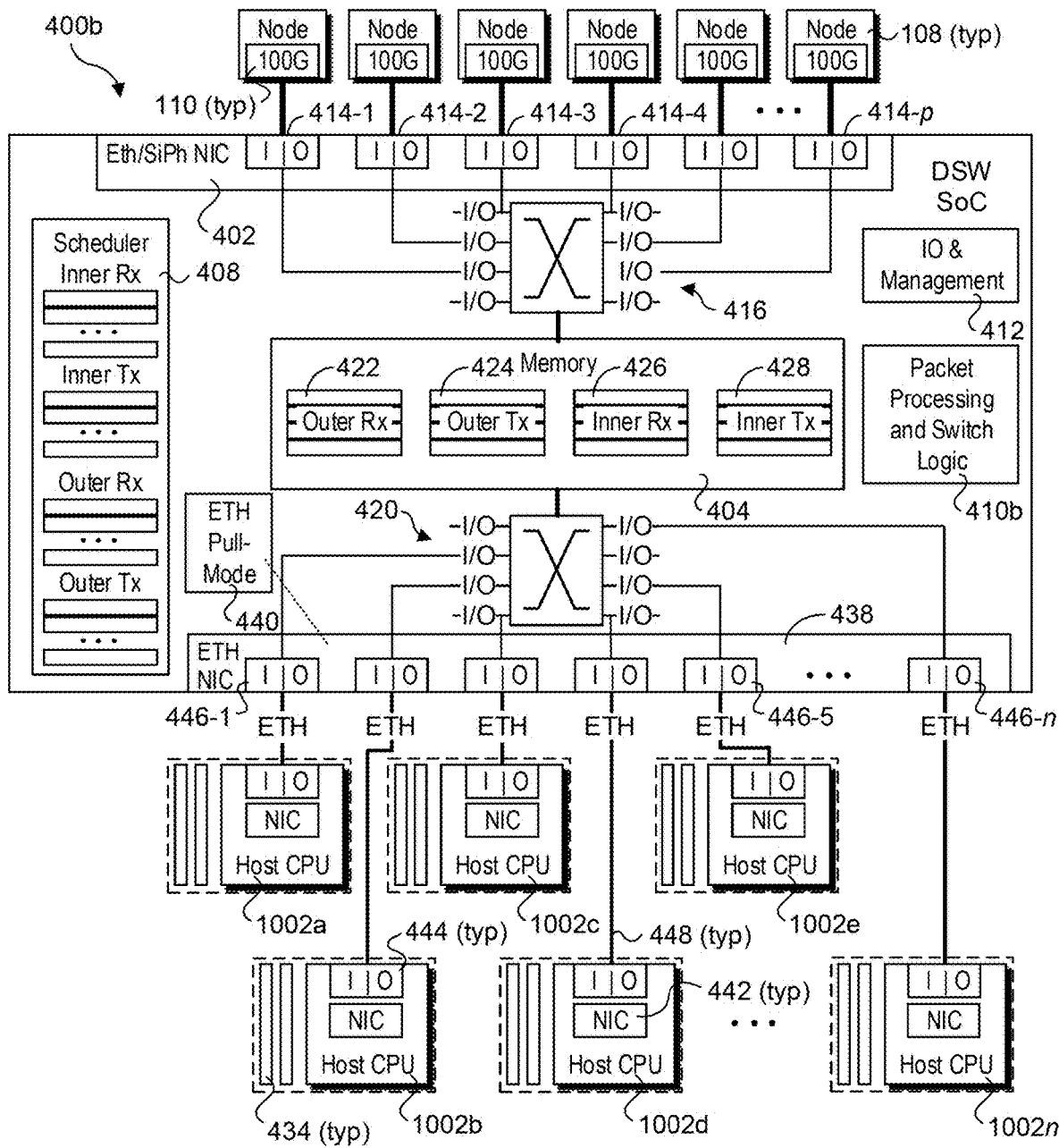
FIG. 4*b* is a schematic diagram of a disaggregated switch architecture using Ethernet outer links over a wired physical layer and Ethernet inner links over a SiPh physical layer.

As shown in FIG. 4b, DSW SoC 400b generally shares similar architecture and components with DSW SoC 400a of FIG. 4a, as indicated by like reference numbers. A difference between the two DSW SoCs is that rather than supporting PCIe links and PCIe pull-mode data transfers, DSW SoC 404b supports Ethernet links over which pull-mode data transfers from microservers 1102a-1102n to the DSW SoC are implemented. This is facilitated through the use of an Ethernet NIC 438 that has been modified with Ethernet pull-mode logic 440 to support pull-mode data transfers over Ethernet in accordance with the embodiments discussed above. Each of microservers 1102a-1102n includes a similarly modified Ethernet NIC 442 and Ethernet port 444 that is coupled to a respective Ethernet port 446a-446n in Ethernet NIC 438 via an Ethernet link 448. DSW SoC 400b also includes packet processing and switch logic 410b that is configured to facilitate switching of Ethernet packets received at the inner and outer ports, and no longer is configured to perform PCIe encapsulation and decapsulation of Ethernet packets, as is the case for packet processing and switch logic 410b discussed above.

In some embodiments, Ethernet links 448 are implemented via corresponding wire traces in backplanes 1104. For example, in respective embodiments, the Ethernet links are in accordance with the IEEE 802.3 1000Base-KX (GbE), 2500Base-KX (2.5 GbE), and 10GBase-KR (10 GbE) Gigabit Ethernet Backplane standards. In addition to these GbE standards, other existing and future GbE backplane standards may be used, such as IEEE 802.3ap 40GBASE-KR 40 GbE and currently proposed IEEE 802.bj 100GBase-KR 100 GbE standards.

Further aspects of the subject matter described herein are set out in the following numbered clauses:

Clause 1. A method for transferring data between a plurality of servers and a disaggregated edge switch, comprising:

communicatively coupling the plurality of servers to the disaggregated edge switch via respective local communication links between an outer port on the disaggregated switch and a communication port on each server, each outer port and each server communication port comprising a local port; and transferring data between the disaggregated edge switch and the plurality of servers using pull-mode data transfers under which data is pulled from a source local port by a destination local port and transferred over the local communication link between the source local port and the destination local port.

Clause 2. The method of clause 1, wherein at least a portion of the local communication links comprise Peripheral Component Interconnect Express (PCIe) links, and data is transferred between a server and the disaggregated switch using a PCIe pull model.

Clause 3. The method of clause 1 or 2, wherein at least a portion of the local communication links comprise Ethernet links, and data is transferred between a server and the disaggregated switch using a pull-model implemented over Ethernet.

Clause 4. The method of any of the proceeding clauses, further comprising implementing a transmit queuing model under which transmit queues for local traffic between the plurality of servers within the server chassis are segregated in a server on a per local destination port basis.

Clause 5. The method of clause 4, wherein the per local destination port transmit queue segregation comprises a first level of transmit queue segregation, further comprising implementing at least one additional level of transmit queue segregation for at least one local destination port in parallel with the per local destination port transmit queue segregation.

Clause 6. The method of clause 4, further comprising scheduling a pull-mode transfer of data from a server to the disaggregated edge switch only if the local destination port associated with the server is currently free or is assumed to be free once the data will reach the local destination port.

Clause 7. The method of any of the proceeding clauses, further comprising providing information to each server for which pull-mode data transfers are to be employed that the server is connected to a disaggregated edge switch that supports pull-mode data transfers.

Clause 8. The method of any of the proceeding clauses, wherein data to be transferred via an inner link to a remote server chassis or to a switch to which the disaggregated edge switch is coupled is transferred from a server using a push-mode data transfer between the server and disaggregated edge switch via the local communication link associated with the server.

Clause 9. The method of any of the proceeding clauses, further comprising implementing a pull-mode data transfer between the disaggregated edge switch and one of a switch or second disaggregated edge switch in a remote server chassis coupled to the disaggregated edge switch via an inner link.

Clause 10. The method of clause 9, wherein the pull-mode data transfer is implemented over an Ethernet link comprising the inner link through use of an extension to the Ethernet protocol.

Clause 11. The method of any of the proceeding clauses, further comprising scheduling incoming traffic received via an inner link from a source that is external to the server chassis to have precedence over local traffic between servers within the server chassis.

Clause 12. A disaggregated switch apparatus, comprising:
a memory;
a remote communication interface operatively coupled to the memory and including at least one inner port;
a local communication interface operatively coupled to the memory and including a plurality of outer ports, each configured to be communicatively coupled with a respective host via a local communication link; and
circuitry and logic to,
allocate a plurality of buffers in the memory, the buffers including a transmit buffer and receive buffer for each inner port and for each outer port;
implement a pull-mode transfer of data from a buffer in the host to an outer port receive buffer allocated for the outer port to which the data is transferred from the host; and
schedule transmission of data buffered in the outer transmit buffers to be transferred outbound from the outer ports.

Clause 13. The disaggregated switch apparatus of clause 12, wherein the local communication interface comprises a Peripheral Component Interconnect Express (PCIe) interface, and wherein the pull-mode transfer of data is implemented via a PCIe pull-mode data transfer.

Clause 14. The disaggregated switch apparatus of clause 12 or 13, wherein the local communication interface comprises an Ethernet interface, and wherein the pull-mode transfer of data is implemented via a pull-mode data transfer over Ethernet.

Clause 15. The disaggregated switch apparatus of any of clauses 12-14, wherein the remote communication interface comprises an Ethernet interface.

Clause 16. The disaggregated switch apparatus of clause 15, wherein the Ethernet interface employs a Silicon Photonics (SiPh) physical layer.

Clause 17. The disaggregated switch apparatus of any of clauses 12-16, wherein the circuitry and logic is further to:
segregate the transmit buffers into a plurality of transmit queues; and
implement a transmit queuing model under which transmit queues for local traffic between the plurality of hosts are segregated per outer port.

Clause 18. The disaggregated switch apparatus of clause 17, wherein the per outer port transmit queue segregation comprises a first level of transmit queue segregation, and where the circuitry and logic is further configured to implement at least one additional level of transmit queue segregation for at least one outer port in parallel with the per local destination port transmit queue segregation.

Clause 19. The disaggregated switch apparatus of clause 17, wherein the circuitry and logic is further configured to schedule a pull-mode transfer of data from a host to the disaggregated switch apparatus only if the outer port associated with the host is currently free or is assumed to be free once the data will reach the outer port.

Clause 20. The disaggregated switch apparatus of any of clauses 12-19, further comprising logic and circuitry to implement a pull-mode data transfer between the apparatus and one of a remote apparatus when the remote apparatus is communicatively coupled to an inner port of the apparatus via an inner link.

Clause 21. The disaggregated switch apparatus of clause 20, wherein the pull mode data transfer is implemented over an Ethernet link comprising the inner link through use of an extension to the Ethernet protocol.

Clause 22. The disaggregated switch apparatus of any of clauses 12-21, wherein the circuitry and logic is further configured to schedule incoming traffic received via an inner link from a remote source to have precedence over local traffic between hosts that is received at the outer ports.

Clause 23. An apparatus comprising:
a server chassis;
a plurality of servers, contained within the server chassis, each server including a communication interface including a local communication port comprising a local endpoint; and
a disaggregated edge switch, including a plurality of outer ports and at least one inner port, each outer port communicatively coupled to a local communication port of respective server via a respective local communication link and comprising a local endpoint, each of the outer ports and the at least one inner port operatively coupled to memory on the disaggregated edge switch, the disaggregated edge switch further comprising circuitry and logic to transfer data between the disaggregated edge switch and the plurality of servers using pull-mode data transfers under which data is pulled from a source local endpoint by a local destination endpoint and transferred over the local communication link between the source local endpoint and the destination local endpoint.

Clause 24. The apparatus of clause 23, wherein a local communication link comprises a Peripheral Component Interconnect Express (PCIe) link, and wherein a pull-mode transfer of data between source and destination PCIe endpoints coupled via the PCIe link is implemented via a PCIe pull mode data transfer.

Clause 25. The apparatus of clause 23 or 24, wherein a local communication link comprises an Ethernet link, and wherein a pull-mode transfer of data between source and destination Ethernet endpoints coupled via the Ethernet link is implemented via a pull-mode data transfer over Ethernet.

Clause 26. The apparatus any of clauses 23-25, wherein the remote communication interface comprises an Ethernet interface that employs a Silicon Photonics (SiPh) physical layer Clause 27. The apparatus of any of clauses 23-26, wherein the circuitry and logic is further configured to:
allocate a plurality of buffers in the memory, the buffers including a transmit buffer and receive buffer for each inner port and for each outer port;
segregate the transmit buffers into a plurality of transmit queues; and
implement a transmit queuing model under which transmit queues for local traffic between the plurality of servers are segregated per local destination port.

Clause 28. The apparatus of clause 27, wherein the per local destination port transmit queue segregation comprises a first level of transmit queue segregation, and where the circuitry and logic is further configured to implement at least one additional level of transmit queue segregation for at least one outer port in parallel with the per local destination port transmit queue segregation.

Clause 29. The apparatus of clause 28, wherein the circuitry and logic is further configured to schedule a pull-mode transfer of data from a host to the disaggregated switch apparatus only if the outer port associated with the host is currently free or is assumed to be free once the data will reach the outer port.

Clause 30. The apparatus of any of clauses 23-19, further comprising logic and circuitry to implement a pull-mode data transfer between the apparatus and one of a remote apparatus when the remote apparatus is communicatively coupled to an inner port of the apparatus via an inner link.

Clause 31. A disaggregated switch apparatus, comprising:
a memory;
a remote communication interface operatively coupled to the memory and including at least one inner port;
a local communication interface operatively coupled to the memory and including a plurality of outer ports, each configured to be communicatively coupled with a respective host via a local communication link; and
means for,
allocating a plurality of buffers in the memory, the buffers including a transmit buffer and receive buffer for each inner port and for each outer port;
implementing a pull-mode transfer of data from a buffer in the host to an outer port receive buffer allocated for the outer port to which the data is transferred from the host; and
scheduling transmission of data buffered in the outer transmit buffers to be transferred outbound from the outer ports.

Clause 32. The disaggregated switch apparatus of clause 31, wherein the local communication interface comprises a Peripheral Component Interconnect Express (PCIe) interface, and wherein the pull-mode transfer of data is implemented via a PCIe pull-mode data transfer.

Clause 33. The disaggregated switch apparatus of clause 31 or 32, wherein the local communication interface comprises an Ethernet interface, and wherein the pull-mode transfer of data is implemented via a pull-mode data transfer over Ethernet.

Clause 34. The disaggregated switch apparatus of any of clauses 31-33, wherein the remote communication interface comprises an Ethernet interface employing a Silicon Photonics (SiPh) physical layer.

Clause 35. The disaggregated switch apparatus of any of clauses 31-34, further comprising means for:
segregating the transmit buffers into a plurality of transmit queues; and
implementing a transmit queuing model under which transmit queues for local traffic between the plurality of hosts are segregated per outer port.

Clause 36. The disaggregated switch apparatus of clause 35, wherein the per outer port transmit queue segregation comprises a first level of transmit queue segregation, further comprising means for implementing at least one additional level of transmit queue segregation for at least one outer port in parallel with the per local destination port transmit queue segregation.

Clause 37. The disaggregated switch apparatus of clause 35, further comprising means for scheduling a pull-mode transfer of data from a host to the disaggregated switch apparatus only if the outer port associated with the host is currently free or is assumed to be free once the data will reach the outer port.

Clause 38. The disaggregated switch apparatus of any of clauses 31-38, further comprising means for implementing a pull-mode data transfer between the apparatus and one of a remote apparatus when the remote apparatus is communicatively coupled to an inner port of the apparatus via an inner link.

Clause 39. The disaggregated switch apparatus of clause 38, wherein the pull mode data transfer is implemented over an Ethernet link comprising the inner link through use of an extension to the Ethernet protocol.

Clause 40. The disaggregated switch apparatus of any of clauses 31-39, further comprising means for scheduling incoming traffic received via an inner link from a remote source to have precedence over local traffic between hosts that is received at the outer ports.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" or "operatively coupled" may also mean that two or more elements are not in direct contact with each other, but yet still co-operate or interact with each other.

An embodiment is an implementation or example of the inventions or aspects thereof. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for transferring data between a plurality of servers and a disaggregated edge switch, comprising:
communicatively coupling the plurality of servers to the disaggregated edge switch via respective local communication links between an outer port on the disaggregated edge switch and a communication port on each server, each server communication port comprising a source local port, each outer port comprising a port in a physical communication interface on the disaggregated edge switch and comprising a destination local port; and
transferring data between the disaggregated edge switch and the plurality of servers using pull-mode data transfers under which, for each pull-mode data transfer, data is pulled from a server by the physical communication interface on the disaggregated edge switch and transferred over the local communication link between the source local port on the server and the destination local port coupled to the local communication link.

2. The method of claim 1, wherein at least a portion of the local communication links comprise Peripheral Component Interconnect Express (PCIe) links, and data is transferred between a server and the disaggregated switch using a PCIe pull model implemented in the physical communication interface, wherein the data comprises Ethernet packets that are encapsulated in PCIe packets.

3. The method of claim 1, wherein at least a portion of the local communication links comprise Ethernet links, and data is transferred between a server and the disaggregated switch using an Ethernet pull-model implemented in the physical communication interface, wherein the Ethernet pull-model employs a pull-mode protocol that is an extension to a standard Ethernet protocol.

4. The method of claim 1, wherein the plurality of servers are installed in a server chassis, further comprising implementing a transmit queuing model under which transmit queues for local traffic between the plurality of servers within the server chassis are segregated in a server on a per local destination port basis.

5. The method of claim 4, wherein the per local destination port transmit queue segregation comprises a first level of transmit queue segregation, further comprising implementing at least one additional level of transmit queue segregation for at least one local destination port in parallel with the per local destination port transmit queue segregation.

6. The method of claim 4, further comprising scheduling a pull-mode transfer of data from a server to the disaggregated edge switch only if the local destination port associated with the server is currently free or is assumed to be free once the data will reach the local destination port.

7. The method of claim 1, further comprising providing information to each server for which pull-mode data transfers are to be employed that the server is connected to a disaggregated edge switch that supports pull-mode data transfers.

8. The method of claim 1, wherein data to be transferred via an inner link to a remote server chassis or to a switch to which the disaggregated edge switch is coupled is transferred from a server using a push-mode data transfer between the server and disaggregated edge switch via the local communication link associated with the server.

9. The method of claim 1, further comprising implementing a pull-mode data transfer between the disaggregated edge switch and one of a switch or second disaggregated edge switch in a remote server chassis coupled to the disaggregated edge switch via an inner link.

10. The method of claim 9, wherein the pull-mode data transfer is implemented over an Ethernet link comprising the inner link through use of an extension to a standard Ethernet protocol.

11. The method of claim 1, wherein the plurality of servers are installed in a server chassis, further comprising scheduling incoming traffic received via an inner link from a source that is external to the server chassis to have precedence over local traffic between servers within the server chassis.

12. A disaggregated switch apparatus, comprising:
a memory;
a remote physical communication interface operatively coupled to the memory and including at least one inner port;
a local physical communication interface operatively coupled to the memory and including a plurality of physical outer ports, each outer port configured to be communicatively coupled with a respective host via a local physical communication link; and
circuitry and logic to,
allocate a plurality of buffers in the memory, the buffers including a transmit buffer and receive buffer for each inner port and for each outer port;
implement a pull-mode transfer of data from a buffer in the host to an outer port receive buffer allocated for the outer port to which the data is transferred from the host; and
schedule transmission of data buffered in the outer transmit buffers to be transferred outbound from the outer ports.

13. The disaggregated switch apparatus of claim 12, wherein the local physical communication interface comprises a Peripheral Component Interconnect Express (PCIe) interface, and wherein the pull-mode transfer of data is implemented via a PCIe pull-mode data transfer originating from the PCIe interface, wherein the data comprises Ethernet packets that are encapsulated in PCIe packets.

14. The disaggregated switch apparatus of claim 12, wherein the local physical communication interface comprises an Ethernet interface, and wherein the pull-mode transfer of data is implemented via an Ethernet pull-model implemented in the physical communication interface, wherein the Ethernet pull-model employs a pull-mode protocol that is an extension to a standard Ethernet protocol.

15. The disaggregated switch apparatus of claim 12, wherein the remote communication interface comprises an Ethernet interface.

16. The disaggregated switch apparatus of claim 15, wherein the Ethernet interface employs a Silicon Photonics (SiPh) physical layer.

17. The disaggregated switch apparatus of claim 12, wherein the circuitry and logic is further to:
segregate the transmit buffers into a plurality of transmit queues; and
implement a transmit queuing model under which transmit queues for local traffic between the plurality of hosts are segregated per outer port.

18. The disaggregated switch apparatus of claim 17, wherein the per outer port transmit queue segregation comprises a first level of transmit queue segregation, and where the circuitry and logic is further configured to implement at least one additional level of transmit queue segregation for at least one outer port in parallel with the per local destination port transmit queue segregation.

19. The disaggregated switch apparatus of claim 17, wherein the circuitry and logic is further configured to schedule a pull-mode transfer of data from a host to the disaggregated switch apparatus only if the outer port associated with the host is currently free or is assumed to be free once the data will reach the outer port.

20. The disaggregated switch apparatus of claim 12, further comprising logic and circuitry to implement a pull-mode data transfer between the apparatus and one of a remote apparatus when the remote apparatus is communicatively coupled to an inner port of the apparatus via an inner link.

21. The disaggregated switch apparatus of claim 20, wherein the pull mode data transfer is implemented over an Ethernet link comprising the inner link through use of an extension to a standard Ethernet protocol.

22. The disaggregated switch apparatus of claim 12, wherein the circuitry and logic is further configured to schedule incoming traffic received via an inner link from a remote source to have precedence over local traffic between hosts that is received at the outer ports.

23. An apparatus comprising:
a server chassis;
a plurality of servers, contained within the server chassis, each server including a communication interface including a local communication port comprising a local endpoint; and
a disaggregated edge switch, including a plurality of outer ports in a physical communications interface and at least one inner port, each outer port communicatively coupled to a local communication port of a respective server via a respective local communication link and comprising a local endpoint, each of the outer ports and the at least one inner port operatively coupled to memory on the disaggregated edge switch, the disaggregated edge switch further comprising circuitry and logic to transfer data between the disaggregated edge switch and the plurality of servers using pull-mode data transfers originating from the physical communications interface under which data is pulled from a source local endpoint by a local destination endpoint and transferred over the local communication link between the source local endpoint and the destination local endpoint.

24. The apparatus of claim 23, wherein a local communication link comprises a Peripheral Component Interconnect Express (PCIe) link and the physical communications interface comprises a PCIe interface, and wherein a pull-mode transfer of data between source and destination PCIe endpoints coupled via the PCIe link is implemented via a PCIe pull mode data transfer originating from the PCIe interface, wherein the data comprises Ethernet packets that are encapsulated in PCIe packets.

25. The apparatus of claim 23, wherein a local communication link comprises an Ethernet link, and wherein a pull-mode transfer of data between source and destination Ethernet endpoints coupled via the Ethernet link is facilitated via an Ethernet pull-mode data transfer over Ethernet implemented in the physical communication interface, wherein the Ethernet pull-model employs a pull-mode protocol that is an extension to a standard Ethernet protocol.

26. The apparatus of claim 23, wherein the remote communication interface comprises an Ethernet interface that employs a Silicon Photonics (SiPh) physical layer.

27. The apparatus of claim 23, wherein the circuitry and logic is further configured to:
- allocate a plurality of buffers in the memory, the buffers including a transmit buffer and receive buffer for each inner port and for each outer port;
- segregate the transmit buffers into a plurality of transmit queues; and
- implement a transmit queuing model under which transmit queues for local traffic between the plurality of servers are segregated per local destination port.

28. The apparatus of claim 27, wherein the per local destination port transmit queue segregation comprises a first level of transmit queue segregation, and where the circuitry and logic is further configured to implement at least one additional level of transmit queue segregation for at least one outer port in parallel with the per local destination port transmit queue segregation.

29. The apparatus of claim 28, wherein the circuitry and logic is further configured to schedule a pull-mode transfer of data from a host to the apparatus only if the outer port associated with the host is currently free or is assumed to be free once the data will reach the outer port.

30. The apparatus of claim 23, further comprising logic and circuitry to implement a pull-mode data transfer between the apparatus and one of a remote apparatus when the remote apparatus is communicatively coupled to an inner port of the apparatus via an inner link.

* * * * *